US012741564B2

(12) United States Patent
Sasaki

(10) Patent No.: US 12,741,564 B2
(45) Date of Patent: Sep. 22, 2026

(54) ELECTRIFIED VEHICLE AND METHOD FOR CONTROLLING TEMPERATURE OF STORAGE BATTERY

(71) Applicant: TOYOTA JIDOSHA KABUSHIKI KAISHA, Toyota (JP)

(72) Inventor: Hirotaka Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/531,812

(22) Filed: Dec. 7, 2023

(65) Prior Publication Data

US 2024/0208366 A1 Jun. 27, 2024

(30) Foreign Application Priority Data

Dec. 26, 2022 (JP) ................................ 2022-208784

(51) Int. Cl.
*B60L 58/25* (2019.01)

(52) U.S. Cl.
CPC ........... *B60L 58/25* (2019.02); *B60L 2240/72* (2013.01); *B60L 2260/56* (2013.01)

(58) Field of Classification Search
None
See application file for complete search history.

(56) References Cited

U.S. PATENT DOCUMENTS

2020/0076020 A1 3/2020 Ogaki et al.
2023/0316171 A1* 10/2023 Shigyo .................... B60L 53/63 701/426
2025/0026239 A1* 1/2025 Yaguchi ................ B60W 20/15

FOREIGN PATENT DOCUMENTS

JP 2020013726 A * 1/2020
JP 2020-039226 A 3/2020
JP 2022-151635 A 10/2022
JP 2023-153480 A 10/2023

* cited by examiner

*Primary Examiner* — Davin Seol
(74) *Attorney, Agent, or Firm* — Oliff PLC

(57) ABSTRACT

An electrified vehicle according to the present disclosure is an electrified vehicle including a storage battery configured to be charged with an external power supply. The electrified vehicle includes: a temperature adjustment device configured to adjust a temperature of the storage battery; and a control device configured to control the temperature adjustment device. The control device is configured to control the temperature adjustment device in such a manner that the temperature of the storage battery at a start of charging becomes a target temperature set based on maximum output of the external power supply.

5 Claims, 4 Drawing Sheets

FIG. 1

ELECTRIFIED VEHICLE AND METHOD FOR CONTROLLING TEMPERATURE OF STORAGE BATTERY

CROSS-REFERENCE TO RELATED APPLICATION

This application claims priority to Japanese Patent Application No. 2022-208784 filed on Dec. 26, 2022, incorporated herein by reference in its entirety.

BACKGROUND

1. Technical Field

The present disclosure relates to electrified vehicles and methods for controlling the temperature of a storage battery, and more particularly to an electrified vehicle including a storage battery that is chargeable with an external power supply.

2. Description of Related Art

Japanese Unexamined Patent Application Publication No. 2020-39226 (JP 2020-39226 A) discloses a system for controlling cooling of a battery of an electrified vehicle. In JP 2020-39226 A, when it is determined that there is a sign that the battery will be charged, it is determined whether the battery needs to be cooled. The determination as to whether the battery needs to be cooled is made based on the real-time battery temperature, the amount of battery temperature increase due to charging, and the allowable battery temperature. When it is determined that the battery needs to be cooled, the battery is cooled either or both of while the vehicle is traveling and while the vehicle is at a stop.

SUMMARY

A battery (storage battery) has preferable charging power (charging current) according to its temperature. Charging the storage battery with a current higher than the preferable charging power may accelerate degradation of the storage battery. Charging the storage battery with power (current) higher than the acceptable power of the storage battery reduces the charging efficiency and increases power consumption during charging. One possible way to reduce degradation of the storage battery etc. is to limit the charging power when the temperature of the storage battery is high or low. However, this may increase the charging time depending on the battery temperature. It is therefore preferable to adjust the temperature of the storage battery to an appropriate temperature before the start of charging when charging of the storage battery is expected.

Charging equipment for storage batteries (electric vehicle supply equipment or electric vehicle service equipment: EVSEs) is roughly classified into normal chargers (alternating current (AC) chargers) and fast chargers (direct current (DC) chargers). The output power (rated maximum output) is 3 kW to 6 kW for the normal chargers and 40 to 300 kW for the fast chargers. During charging, the temperature of the storage battery increases due to heat generation. The degree to which the temperature increases during charging varies depending on the magnitude of the charging power (charging current) etc. Since the charging time (e.g., time to full charge) varies depending on the magnitude of the charging power, the period during which the battery temperature increases due to heat generation also varies depending on the magnitude of the charging power. Therefore, an appropriate storage battery temperature before the start of charging varies depending on the output characteristics of the EVSE.

The present disclosure reduces power consumption and charging time by appropriately adjusting the temperature of a storage battery before the start of charging.

An electrified vehicle according to the present disclosure is an electrified vehicle including a storage battery configured to be charged with an external power supply. The electrified vehicle includes: a temperature adjustment device configured to adjust a temperature of the storage battery; and a control device configured to control the temperature adjustment device. The control device is configured to control the temperature adjustment device in such a manner that the temperature of the storage battery at a start of charging becomes a target temperature set based on maximum output of the external power supply.

According to this configuration, the temperature adjustment device configured to adjust the temperature of the storage battery adjusts the temperature of the storage battery so that the temperature of the storage battery at the start of charging becomes the target temperature set based on the maximum output of the external power supply. The target temperature at the start of charging can thus be set in consideration of the degree to which the temperature increases due to heat generation, the charging time, etc. The temperature of the storage battery before the start of charging can therefore be appropriately adjusted. As a result, power consumption and charging time can be reduced. The maximum output of the external power supply may be rated maximum output of an EVSE.

The control device may include: a charging prediction unit configured to predict a possibility that the storage battery is going to be charged; an external power supply information acquisition unit configured to acquire information on the external power supply; and a target temperature calculation unit configured to calculate the target temperature of the storage battery. The target temperature calculation unit may be configured to calculate the target temperature based on the maximum output of the external power supply when prediction is made that there is the possibility that the storage battery is going to be charged.

According to this configuration, when the charging prediction unit predicts that there is the possibility that the storage battery is going to be charged, the target temperature calculation unit calculates the target temperature based on the maximum output of the external power supply. The temperature adjustment device is controlled in such a manner that the temperature of the battery at the start of charging becomes the calculated target temperature. As described above, the target temperature is set when there is the possibility that the storage battery is going to be charged. Therefore, the temperature of the storage battery at the start of charging can be adjusted at an appropriate timing.

The charging prediction unit may predict the possibility that the storage battery is going to be charged, based on a destination set in a navigation device, the relationship between a state of charge (SOC) of the battery and a travel route of the electrified vehicle, etc. The charging prediction unit may learn behavior patterns of users of electrified vehicles by machine learning (e.g., deep learning) and may predict a charging behavior of the user.

The target temperature calculation unit may be configured to calculate a first target temperature based on the maximum output of the external power supply when the temperature of the storage battery is higher than a set temperature, and to calculate a second target temperature based on the maximum output of the external power supply when the temperature of the storage battery is lower than the set temperature. The control device may be configured to control the temperature adjustment device in such a manner that the temperature of the storage battery at the start of charging becomes the first target temperature or the second target temperature.

According to this configuration, when the temperature of the storage battery is higher than the set temperature, the temperature of the storage battery is adjusted in such a manner that the temperature of the storage battery at the start of charging becomes the first target temperature. When the temperature of the storage battery is lower than the set temperature, the temperature of the storage battery is adjusted in such a manner that the temperature of the storage battery at the start of charging becomes the second target temperature. Therefore, the target temperature to be used when cooling the storage battery (first target temperature) and the target temperature to be used when heating the storage battery (second target temperature) can be set separately. As a result, appropriate temperature adjustment can be performed in consideration also of energy consumption of the temperature adjustment device etc.

The control device may be configured to communicate with an external server. The external power supply information acquisition unit may be configured to acquire the information on the external power supply from the external server.

An electrified vehicle according to the present disclosure is an electrified vehicle including a storage battery configured to be charged with an external power supply. The electrified vehicle includes: a temperature adjustment device configured to adjust a temperature of the storage battery; and a control device configured to control the temperature adjustment device. The control device is configured to set a target temperature of the storage battery at a start of charging to a lower value when maximum output of the external power supply is high than when the maximum output of the external power supply is low, and control the temperature adjustment device in such a manner that the temperature of the storage battery at the start of charging becomes the target temperature.

According to this configuration, the control device sets the target temperature to a lower value when the maximum output of the external power supply is high than when the maximum output of the external power supply is low, and the temperature adjustment device configured to adjust the temperature of the storage battery adjusts the temperature of the storage battery in such a manner that the temperature of the storage battery at the start of charging becomes the target temperature. The target temperature at the start of charging can thus be set in consideration of the degree to which the temperature increases due to heat generation, the charging time, etc. The temperature of the storage battery before the start of charging can therefore be appropriately adjusted. As a result, power consumption and charging time can be reduced. The maximum output of the external power supply may be rated maximum output of an EVSE.

A method for controlling a temperature of a storage battery according to the present disclosure is a method for controlling a temperature of a storage battery mounted on an electrified vehicle and configured to be charged with an external power supply. The method includes: acquiring information on the external power supply; setting a target temperature of the storage battery at a start of charging based on maximum output of the external power supply; and controlling the temperature of the storage battery in such a manner that the temperature of the storage battery at the start of charging becomes the target temperature.

According to this method, the temperature of the storage battery is adjusted in such a manner that the temperature of the storage battery at the start of charging becomes the target temperature set based on the maximum output of the external power supply. The target temperature at the start of charging can thus be set in consideration of the degree to which the temperature increases due to heat generation, the charging time, etc. The temperature of the storage battery before the start of charging can therefore be appropriately adjusted. As a result, power consumption and charging time can be reduced.

The method may further include predicting a possibility that the storage battery is going to be charged. The temperature of the storage battery may be controlled in such a manner that the temperature of the storage battery at the start of charging becomes the target temperature, when prediction is made that there is the possibility that the storage battery is going to be charged.

According to this method, the temperature of the storage battery is adjusted when there is the possibility that the storage battery is going to be charged. Therefore, the temperature of the storage battery at the start of charging can be adjusted at an appropriate timing.

The method may further include: calculating a first target temperature as the target temperature when the temperature of the storage battery is higher than a set temperature; and calculating a second target temperature as the target temperature when the temperature of the storage battery is lower than the set temperature. The temperature of the storage battery may be controlled in such a manner that the temperature of the storage battery at the start of charging becomes the calculated first target temperature or the calculated second target temperature.

According to this method, when the temperature of the storage battery is higher than the set temperature, the temperature of the storage battery is adjusted in such a manner that the temperature of the storage battery at the start of charging becomes the first target temperature. When the temperature of the storage battery is lower than the set temperature, the temperature of the storage battery is adjusted in such a manner that the temperature of the storage battery at the start of charging becomes the second target temperature. Therefore, the target temperature to be used when cooling the storage battery (first target temperature) and the target temperature to be used when heating the storage battery (second target temperature) can be set separately. As a result, appropriate temperature adjustment can be performed in consideration also of energy consumption for adjusting the temperature of the storage battery etc.

According to the present disclosure, power consumption and charging time can be reduced by appropriately adjusting the temperature of the storage battery before the start of charging.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is an overall configuration diagram of an electrified vehicle according to an embodiment;

DETAILED DESCRIPTION OF EMBODIMENTS

Figure 2:
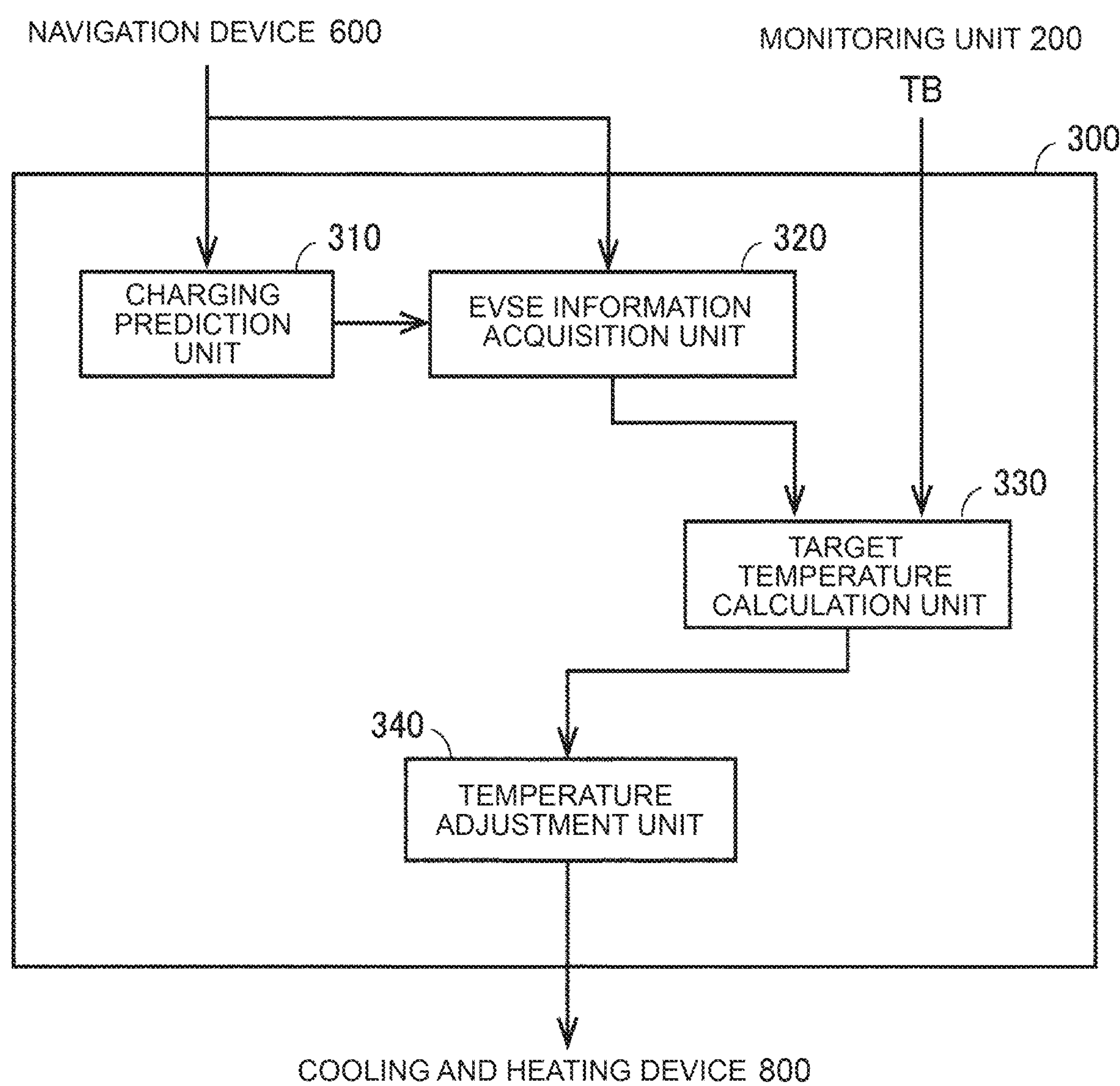
FIG. 2 shows an example of a functional block diagram of an electronic control unit (ECU) according to the embodiment.

An embodiment of the present disclosure will be described in detail below with reference to the drawings. The same or corresponding parts are denoted by the same signs throughout the drawings, and description thereof will not be repeated.

Figure 1:
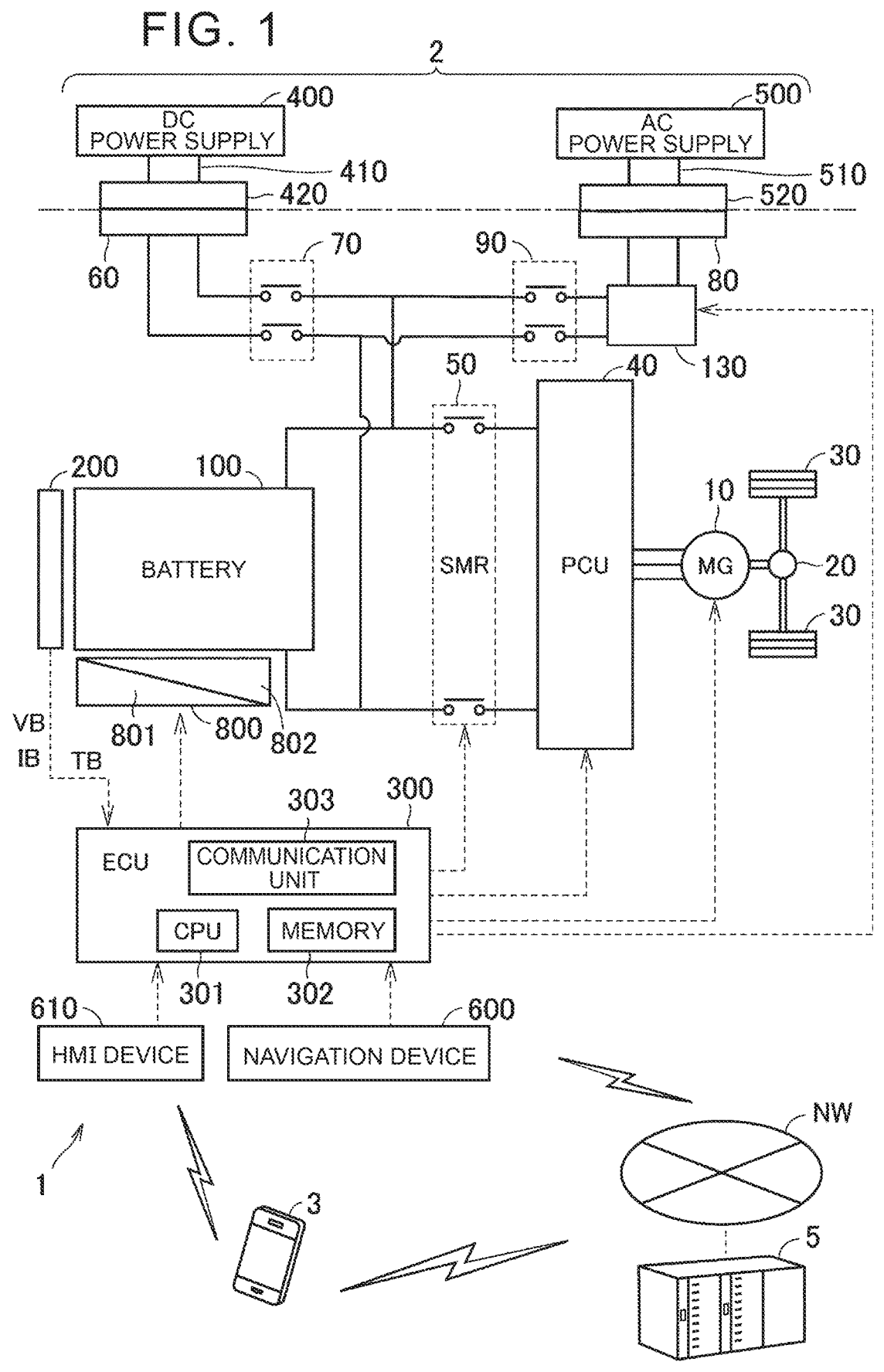

FIG. 1 is an overall configuration diagram of an electrified vehicle 1 according to the present embodiment. In the present embodiment, the electrified vehicle 1 is, for example, a battery electric vehicle (BEV). The electrified vehicle 1 includes a motor generator (MG) 10 that is a rotating electrical machine, a power transmission gear 20, drive wheels 30, a power control unit (PCU) 40, a system main relay (SMR) 50, a battery 100, a monitoring unit 200, and an electronic control unit (ECU) 300 that is an example of a control device.

The MG 10 is, for example, an interior permanent magnet synchronous motor (IPM motor), and has a function as an electric motor and a function as a generator. The output torque of the MG 10 is transmitted to the drive wheels 30 via the power transmission gear 20 that includes a reduction gear, a differential gear, etc.

During braking of the electrified vehicle 1, the MG 10 is driven by the drive wheels 30, and the MG 10 operates as a generator. The MG 10 thus also functions as a braking device that performs regenerative braking by converting kinetic energy of the electrified vehicle 1 to electric power. Regenerative power generated by the regenerative braking force of the MG 10 is stored in the battery 100.

The PCU 40 is a power conversion device that bidirectionally converts power between the MG 10 and the battery 100. The PCU 40 includes, for example, an inverter and a converter that operate based on control signals from the ECU 300. The converter may be omitted from the PCU 40.

The SMR 50 is electrically connected to power lines connecting the battery 100 and the PCU 40. When the SMR 50 is closed (ON) (conductive) according to a control signal from the ECU 300, power can be transferred between the battery 100 and the PCU 40. On the other hand, when the SMR 50 is open (OFF) (disconnected) according to a control signal from the ECU 300, the battery 100 and the PCU 40 are electrically disconnected from each other.

The battery 100 stores power for driving the MG 10. The battery 100 is a rechargeable DC power supply (secondary battery). The battery 100 is composed of a stack of a plurality of single cells (battery cells) that is, for example, electrically connected in series with each other. The battery 100 is a storage battery. Each single cell is, for example, a lithium-ion battery. Each single cell may be either a nickel metal hydride battery or an all-solid-state battery. The battery 100 is an example of the "storage battery" of the present disclosure.

The monitoring unit 200 includes a voltage detection unit, a current sensor, and a temperature detection unit. The voltage detection unit detects a voltage VB of the battery 100. The current sensor detects a current IB that is input to and output from the battery 100. The temperature detection unit detects a temperature TB of the battery 100. Each detection unit outputs its detection result to the ECU 300.

The electrified vehicle 1 includes a direct current (DC) inlet 60 and an alternating current (AC) inlet 80. The battery 100 of the electrified vehicle 1 is chargeable (externally chargeable) with an EVSE (charging equipment) 2 including an external DC power supply 400 or an external AC power supply 500. The DC inlet 60 is configured to be connected to a connector 420 mounted at a distal end of a charging cable 410 of the external DC power supply (EVSE) 400. A charging relay 70 is electrically connected to power lines connecting the DC inlet 60 and the battery 100. The charging relay 70 switches between allowing and not allowing supply of power between the DC inlet 60 and the battery 100 according to a control signal from the ECU 300. External charging (fast charging) of the battery 100 is performed by closing the charging relay 70.

The AC inlet 80 is configured to be connected to a connector 520 mounted at a distal end of a charging cable 510 of the external AC power supply (EVSE) 500. An in-vehicle charger 130 is provided on power lines between the AC inlet 80 and the battery 100. The in-vehicle charger 130 converts AC power supplied from the external AC power supply 500 to DC power and converts the DC power to a voltage that can charge the battery 100. A charging relay 90 is electrically connected to power lines connecting the in-vehicle charger 130 and the battery 100. The charging relay 90 switches between allowing and not allowing supply of power between the in-vehicle charger 130 and the battery 100 according to a control signal from the ECU 300. External charging (normal charging) of the battery 100 is performed by closing the charging relay 90. When charging the electrified vehicle 1 (battery 100), external charging is performed using either the external DC power supply 400 or the external AC power supply 500.

The ECU 300 includes a central processing unit (CPU) 301, a memory 302, and a communication unit 303. The memory 302 includes, for example, a read-only memory (ROM) and a random access memory (RAM). The ECU 300 controls each device to bring the electrified vehicle 1 to a desired state, based on signals received from the monitoring unit 200, signals from various sensors, not shown (e.g., an accelerator operation amount signal, a vehicle speed signal, etc.), and information from maps, programs, etc. stored in the memory 302. The communication unit 303 includes a communication interface (I/F) for the communication unit 303 to wirelessly communicate with a network NW and user equipment 3. The communication unit 303 may include either or both of a telematics control unit (TCU) and a Data Communication Module (DCM) that perform wireless communication. The ECU 300 also controls a cooling and heating device 800 that will be described later.

A navigation device 600 includes a vehicle location calculation unit configured to calculate the current location (vehicle location) based on map data including information such as the location and output of the EVSE (e.g., the DC power supply 400, the AC power supply 500) and Global Positioning System (GPS) information. Like the ECU 300, the navigation device 600 is composed of a CPU, a memory, etc., and is implemented by executing programs stored in the memory. The navigation device 600 provides route guidance to the destination set by a user. It is also possible to add a waypoint(s) to the route to the destination. The map data may be acquired by communication via an external server 5 and the network NW.

A human-machine interface (HMI) device 610 includes an input device and a display device. The HMI device 610 includes a touch panel display that functions as an input device and a display device. The touch panel display also serves as an input device and display device of the navigation device 600.

The user equipment 3 is configured to be portable by the user. The user equipment is mobile equipment that is carried and operated by the user (vehicle manager) of the electrified vehicle 1. In the present embodiment, the user equipment 3 is a smartphone with a touch panel display. The user equipment 3 may be any equipment that can be carried by the user of the electrified vehicle 1. For example, the user equipment 3 may be a laptop, a tablet, a handheld game console, or a wearable device (smartwatch, smart glasses, smart gloves, etc.). The user equipment 3 can communicate with the communication unit 303 by, for example, short-range wireless communication. The user equipment 3 can also communicate with the external server 5 via the network NW.

The external server 5 is configured to communicate with the electrified vehicle 1 (communication unit 303) and the user equipment 3 via the network NW. A database (DB) held in the external server 5 includes information on EVSEs (EVSE information). The EVSE information includes, for example, the identification number (ID), manufacturer (model), type of power supply (AC power supply or DC power supply), possible output range (kW), maximum output (rated maximum output) (kW), location (place), etc. of each EVSE.

The electrified vehicle 1 includes the cooling and heating device 800. The cooling and heating device 800 is configured to adjust the temperature of the battery 100, and is an example of the "temperature adjustment device" of the present disclosure. The cooling and heating device 800 includes a battery cooling unit (battery cooling system) 801 and a battery heating unit (battery heating system) 802. The cooling and heating device 800 may be, for example, the battery temperature adjustment device disclosed in Japanese Unexamined Patent Application Publication No. 2022-151635 (JP 2022-151635 A). In this case, the configuration for cooling the battery 100 using a chiller that is cooled by a refrigeration cycle device used also for indoor air conditioning corresponds to the battery cooling unit 801, and the configuration for heating the battery 100 using a positive temperature coefficient (PTC) heater corresponds to the battery heating unit 802. The cooling and heating device 800 may have any configuration as long as it can cool and heat the battery 100. For example, the cooling and heating device 800 may be an air cooling device (heat exchange using gas as a medium) or a liquid cooling device (heat exchange using liquid as a medium). The cooling and heating device 800 may utilize exhaust heat from the MG 10 or the PCU 40 or may use heat generated by charging and discharging of the battery 100.

The battery 100 has appropriate charging power (charging current) according to the temperature TB of the battery 100. Charging the battery 100 with a current higher than the appropriate charging power may accelerate degradation of the battery 100. Charging the battery 100 with a current higher than the acceptable power (allowable power) of the battery 100 reduces the charging efficiency and increases power consumption during charging. One possible way to reduce degradation of the battery 100 etc. is to limit the charging power (charging current) when the temperature TB is high or low. However, this may increase the charging time depending on the temperature TB. It is therefore preferable to adjust the temperature TB of the battery 100 to an appropriate temperature before the start of charging when external charging of the battery 100 is expected.

During charging of the battery 100, the temperature TB increases due to heat generation. The degree to which the temperature TB of the battery 100 increases during charging varies depending on the magnitude of the charging power (charging current). Since the time to full charge of the battery 100 varies depending on the magnitude of the charging power, the period during which the temperature TB increases due to heat generation also varies depending on the magnitude of the charging power. Therefore, an appropriate temperature TB of the battery 100 before the start of charging varies depending on the output characteristics of the EVSE.

In the present embodiment, the temperature TB of the battery 100 at the start of charging is adjusted according to the magnitude of the output power (kW) of the EVSE, thereby reducing power consumption during charging and charging time.

FIG. 2 shows an example of a functional block diagram of the ECU 300 according to the present embodiment. A charging prediction unit 310 predicts the possibility that the battery 100 will be charged (externally charged), based on information on the destination or waypoint(s) set in the navigation device 600. For example, the charging prediction unit 310 may be configured to predict that there is a possibility that the battery 100 will be charged, when an EVSE (its installation location) is set as the destination or waypoint. When the charging prediction unit 310 predicts that there is a possibility that the battery 100 will be charged, an EVSE information acquisition unit 320 acquires the output (rated output) PE of the EVSE from EVSE information included in the map data of the navigation device 600. The output PE of the EVSE is the maximum power that can be continuously output from the EVSE, and is the rated maximum output (kW). The EVSE information acquisition unit 320 is an example of the "external power supply information acquisition unit" of the present disclosure.

A target temperature calculation unit 330 calculates a target temperature of the battery 100 at the start of charging from the temperature TB of the battery 100 detected by the monitoring unit 200 and the output PE of the EVSE. A temperature adjustment unit 340 controls the cooling and heating device 800 so that the temperature TB becomes the target temperature calculated by the target temperature calculation unit 330.

Figure 3:
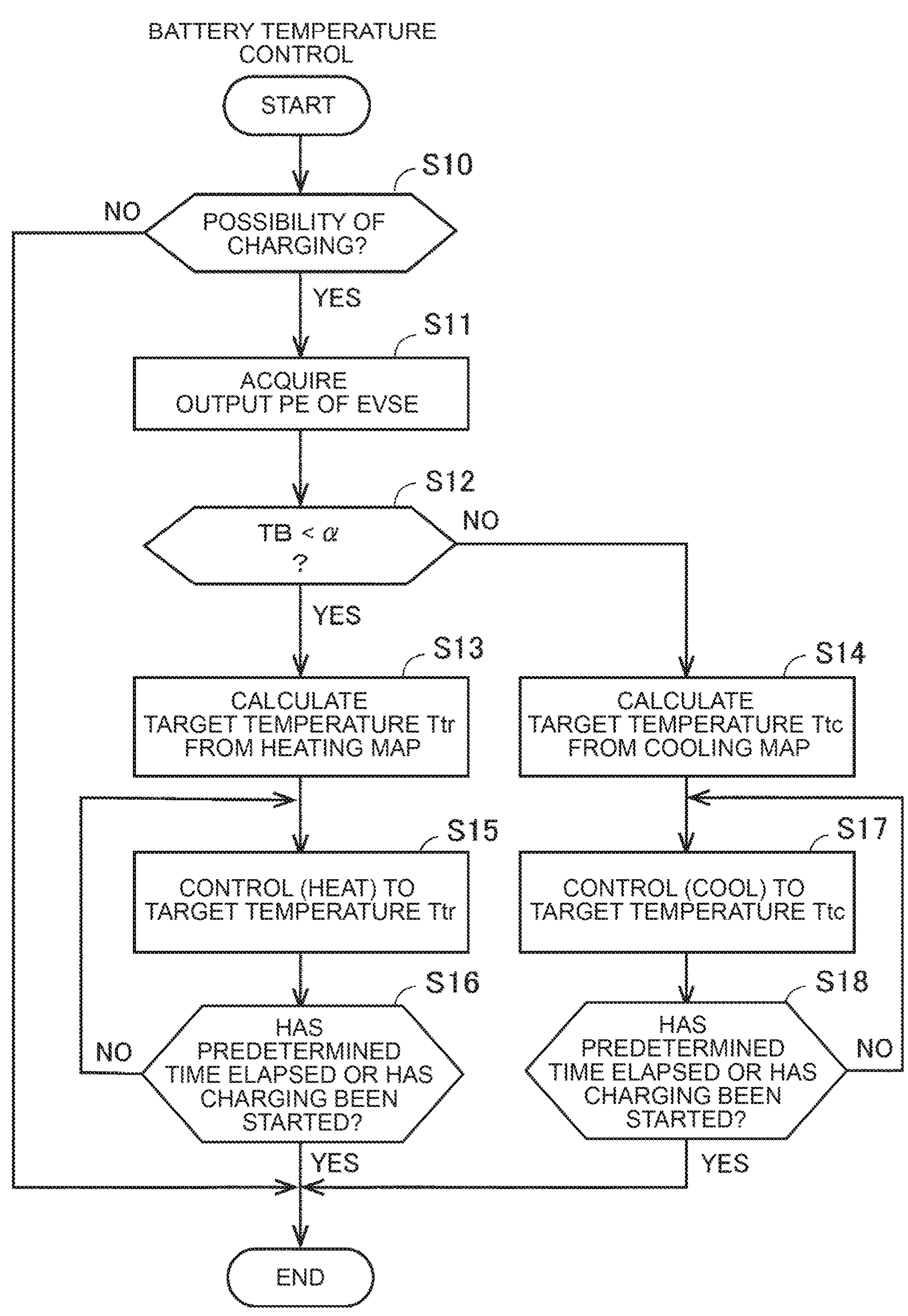
FIG. 3 is a flowchart showing an example of a battery temperature control process that is performed by the ECU.

FIG. 3 is a flowchart showing an example of a battery temperature control process that is performed by the ECU 300. The process of this flowchart is repeatedly performed at predetermined intervals while the electrified vehicle 1 is running (from when a power switch is turned on until the power switch is turned off). First, in step (hereinafter, "step" will be abbreviated to "S") 10, it is determined whether there is a possibility that the battery 100 will be charged. In the present embodiment, when an EVSE (its installation location) is set as a destination or waypoint in the navigation device 600, it is determined that there is a possibility that the battery 100 will be charged. When no EVSE is set as a destination or waypoint, it is determined that there is no possibility that the battery 100 will be charged (NO in S10), and the current routine ends. When an EVSE is set as a destination or waypoint, it is determined that there is a possibility that the battery 100 will be charged (YES in S10), and the routine proceeds to S11.

In S11, the output PE of the EVSE set as a destination or waypoint is acquired from information on this EVSE. For example, the output PE of the EVSE is included in the map data of the navigation device 600, and the output PE of the EVSE is read from the map data. The output PE may be the rated maximum output (kW) of the EVSE.

Thereafter, in S12, it is determined whether the temperature TB of the battery 100 detected by the monitoring unit 200 is lower than a set temperature α. The set temperature α is a threshold for determining whether to cool or heat the battery 100, and is set in advance according to the specifications of the battery 100 by experiments etc. When the temperature TB is lower than the set temperature α (YES in S12), the routine proceeds to S13. When the temperature TB is higher than the set temperature α (when the temperature TB is equal to or higher than the set temperature α) (NO in S12), the routine proceeds to S14.

Figure 4A:
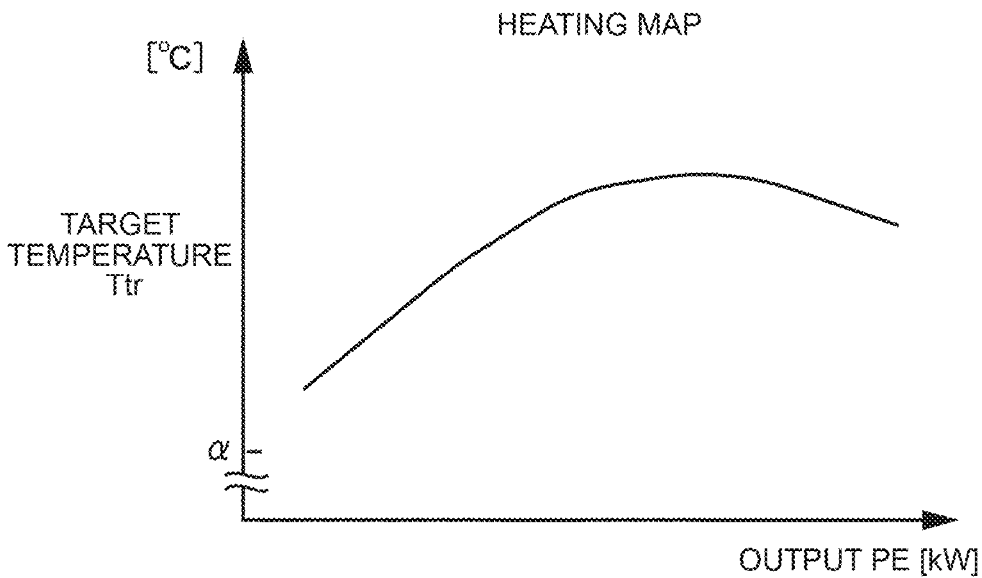
FIG. 4A shows an example of a map for calculating a target temperature.
Figure 4B:
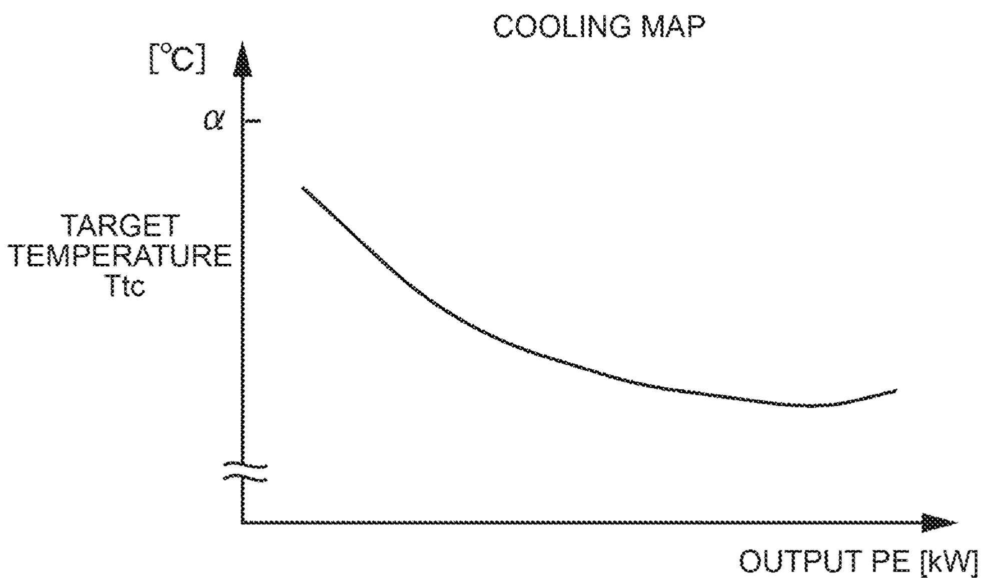
FIG. 4B shows an example of a map for calculating a target temperature.

In S13, a target temperature of the battery 100 is calculated. FIGS. 4A and 4B show examples of a map for calculating the target temperature. FIG. 4A shows a heating map for calculating a target temperature Ttr to be used when heating the battery 100, and FIG. 4B is a cooling map for calculating a target temperature Ttc to be used when cooling the battery 100. In S13, the target temperature Ttr is calculated using the heating map. In FIG. 4A, the abscissa represents the output PE (rated maximum output) of the EVSE, and the ordinate represents the target temperature Ttr. In S13, the target temperature Ttr is calculated from the heating map using the output PE acquired in S11 as a parameter. The target temperature Ttr is an example of the "second target temperature" of the present disclosure.

Subsequently, in S15, the cooling and heating device 800 is controlled. In S15, the battery heating unit 802 heats the battery 100 so that the temperature of the battery 100 becomes the target temperature Ttr. It is desirable that the operation of heating the battery 100 by the cooling and heating device 800 so that the temperature of the battery 100 becomes the target temperature Ttr be started a "set time" before the start of charging of the battery 100. For example, the heating time required for the temperature TB to become the target temperature Ttr is obtained from the difference between the current temperature TB and the target temperature Ttr. The required time for the electrified vehicle 1 to arrive at the EVSE set as a destination or waypoint is calculated from the current location of the electrified vehicle 1, and the heating operation of the cooling and heating device 800 is started when (at the location where) the required time becomes equal to the heating time. In this case, the "heating time" is the "set time." The heating operation of the cooling and heating device 800 may be started after the target temperature Ttr is calculated in S13.

In S16, it is determined whether a predetermined time has elapsed since the heating operation was started, or whether external charging of the electrified vehicle 1 (charging of the battery 100) has been started. When neither the predetermined time has elapsed nor the external charging has been started, the routine returns to S15. When the predetermined time has elapsed or the external charging has been started (YES in S16), the current routine ends. When the routine ends, the operation of the cooling and heating device 800 may be stopped. When temperature adjustment of the battery 100 is performed during charging, the cooling and heating device 800 may continue to operate to perform temperature adjustment control during charging.

In S14, the target temperature Ttc is calculated using the cooling map shown in FIG. 4B. FIG. 4B shows the cooling map for calculating the target temperature Ttc to be used when cooling the battery 100. The abscissa represents the output PE (rated maximum output) of the EVSE, and the ordinate represents the target temperature Ttc. In S14, the target temperature Ttc is calculated from the cooling map using the output PE acquired in S11 as a parameter. The target temperature Ttc is an example of the "first target temperature" of the present disclosure.

Subsequently, in S17, the cooling and heating device 800 is controlled. In S17, the battery cooling unit 801 cools the battery 100 so that the temperature of the battery 100 becomes the target temperature Ttc. It is desirable that the operation of cooling the battery 100 by the cooling and heating device 800 so that the temperature of the battery 100 becomes the target temperature Ttc be started a "set time" before the start of charging of the battery 100. For example, the cooling time required for the temperature TB to become the target temperature Ttc is obtained from the difference between the current temperature TB and the target temperature Ttc. The required time for the electrified vehicle 1 to arrive at the EVSE set as a destination or waypoint is calculated from the current location of the electrified vehicle 1, and the cooling operation of the cooling and heating device 800 is started when (at the location where) the required time becomes equal to the cooling time. In this case, the "cooling time" is the "set time." The cooling operation of the cooling and heating device 800 may be started after the target temperature Ttc is calculated in S17.

In S18, it is determined whether a predetermined time has elapsed since the cooling operation was started, or whether external charging of the electrified vehicle 1 (charging of the battery 100) has been started. When neither the predetermined time has elapsed nor the external charging has been started, the routine returns to S17. When the predetermined time has elapsed or the external charging has been started (YES in S18), the current routine ends. When the routine ends, the operation of the cooling and heating device 800 may be stopped. When temperature adjustment of the battery 100 is performed during charging, the cooling and heating device 800 may continue to operate to perform temperature adjustment control during charging. The "predetermined time" in S16 and S18 is set in order to stop the cooling and heating device 800 in case, for example, the user forgets to charge the battery 100 for a long time after the electrified vehicle 1 arrives at the installation location of the EVSE.

According to the present embodiment, when the charging prediction unit 310 predicts that there is a possibility that the battery 100 will be charged (YES in S10), the target temperature calculation unit 330 calculates a target temperature based on the output PE of the EVSE (S13, S14). The cooling and heating device 800 is then controlled so that the temperature of the battery 100 at the start of charging becomes the calculated target temperature (S15, S17). In this manner, when there is a possibility that the battery 100 will be charged, the temperature of the battery 100 at the start of charging can be appropriately adjusted, so that power consumption and charging time can be reduced.

According to the present embodiment, when the temperature TB of the battery 100 is higher than the set temperature α (NO in S12), the target temperature calculation unit 330 calculates the target temperature Ttc based on the output PE of the EVSE (S14). When the temperature TB of the battery 100 is lower than the set temperature α (YES in S12), the target temperature calculation unit 330 calculates the target temperature Ttr based on the output PE of the EVSE. As described above, the target temperature Ttc to be used when cooling the battery 100 and the target temperature Ttr to be used when heating the battery 100 are set separately. Therefore, appropriate temperature adjustment can be performed in consideration also of energy consumption of the cooling and heating device 800 etc.

In the above embodiment, the target temperature Ttc for cooling and the target temperature Ttr for heating are calculated. However, the target temperature calculation unit 330 may be configured to calculate only one target temperature from the output PE of the EVSE regardless of whether it is for cooling or heating. In this case, the target temperature may be set to be lower when the output PE of the EVSE is high than when the output PE of the EVSE is low. The target temperature may be set so that the higher the output PE, the lower the target temperature.

In the above embodiment, the EVSE information (output PE) is included in the map data of the navigation device 600. However, the EVSE information acquisition unit 320 may acquire information on the output PE from the EVSE information in the database (DB) held in the external server 5 via the network NW. Information on the EVSEs may be stored in the memory 302 of the ECU 300.

In the above embodiment, it is predicated that there is a possibility that the battery 100 will be charged, when the destination or waypoint set in the navigation device 600 is an EVSE (its installation location). However, the means or method for predicting a possibility that the battery 100 will be charged is not limited to this. For example, it may be predicted that there is a possibility that the battery 100 will be charged, when the user operates a "plan-to-charge button" displayed on the HMI device 610. The "plan-to-charge button" is operated by the user at his or her discretion at a specified time before the start of charging in order to reduce power consumption during charging.

It may be predicted that there is a possibility that the battery 100 will be charged, when the user operates the HMI device 610 or the user equipment 3 to make a charging reservation. The charging reservation refers to reserving an EVSE for charging and scheduling the charging start time by operating the HMI device 610 or the user equipment 3. Based on this reservation information, it can be predicted that there is a possibility that the battery 100 will be charged, and the charging start time and information on the EVSE (output PE) can also be acquired.

The possibility that the battery 100 will be charged may be predicted from the relationship between the travel route or current location of the electrified vehicle 1 and the SOC of the battery 100. For example, it may be predicted that there is a possibility that the battery 100 will be charged, when the SOC of the battery 100 becomes lower than a predetermined value and there is an EVSE within a predetermined distance from the current location of the electrified vehicle 1. Alternatively, it may be predicted that there is a possibility that the battery 100 will be charged, when the SOC of the battery 100 becomes lower than the predetermined value and there is an EVSE within a predetermined distance from the travel route of the electrified vehicle 1.

The possibility that the battery 100 will be charged may be predicted from the behavior pattern of the user. For example, a learning model is created by deep learning using the travel route of the electrified vehicle 1, the SOC of the battery 100, the charging start time, the day of the week when charging was performed, etc. as input parameters of the input layer. The learning model thus created may be used to predict the possibility that the battery 100 will be charged.

In the above embodiment, in FIG. 3, when NO in S16, the routine returns to S15, and when NO in S18, the routine returns to S17. Depending on the usage environment, the specifications of the battery 100, etc., the temperature of the battery 100 may change significantly during traveling. In this case, the routine may be configured to return to S12 when NO in S16 and when NO in S18. In this case, even when the temperature TB of the battery 100 has changed significantly during traveling of the electrified vehicle 1, S12 is performed again, so that the temperature of the battery 100 can be controlled toward the target temperature Ttr or the target temperature Ttc that is an appropriate temperature at the start of charging.

The temperature TB and the set temperature $\alpha$ may be compared when the heating operation of the battery heating unit 802 of the cooling and heating device 800 is started in S15, and when the cooling operation of the battery cooling unit 801 of the cooling and heating device 800 is started in S17. When the comparison result is different from the determination result in S12, the map for calculating the target temperature (FIG. 4A, 4B) may be changed to calculate the target temperature and the temperature of the battery 100 may be adjusted. Accordingly, even when the temperature TB of the battery 100 has changed significantly during traveling of the electrified vehicle 1, the temperature of the battery 100 can be controlled toward the target temperature Ttr or the target temperature Ttc that is an appropriate temperature at the start of charging.

In the above embodiment, the electrified vehicle 1 is a BEV. However, the electrified vehicle to which the present disclosure is applicable is not limited to BEVs. For example, the present disclosure is also applicable to plug-in hybrid electric vehicles (PHEVs) that include an engine and a motor generator. The present disclosure is also applicable to fuel cell electric vehicles (FCEVs) that include an externally chargeable storage battery. The present disclosure is also applicable to industrial vehicles such as forklifts.

The embodiment disclosed herein should be construed as illustrative in all respects and not restrictive. The scope of the present disclosure is shown by the claims rather than by the above description of the embodiment, and is intended to include all modifications within the meaning and scope equivalent to those of the claims.

What is claimed is:

1. An electrified vehicle including a storage battery configured to be charged with an external power supply having a maximum output, the electrified vehicle comprising:

- a temperature adjustment device configured to adjust a temperature of the storage battery;
- a control device configured to:
  - calculate a first target temperature using a first map that correlates the maximum output of the external power supply with target cooling temperatures when the temperature of the storage battery is higher than a set temperature,
  - calculate a second target temperature using a second map that correlates the maximum output of the external power supply with target heating temperatures when the temperature of the storage battery is lower than the set temperature; and
  - control the temperature adjustment device in such a manner that the temperature of the storage battery at a start of charging becomes the first target temperature or the second target temperature.

2. The electrified vehicle according to claim 1, wherein:

the control device includes

- a charging prediction unit configured to predict a possibility that the storage battery is going to be charged, and an external power supply information acquisition unit configured to acquire information on the external power supply, wherein the target temperature calculation unit is configured to calculate the first target temperature or the second target temperature based on the maximum output of the external power supply when prediction is made that there is the possibility that the storage battery is going to be charged.

3. The electrified vehicle according to claim 2, wherein:

the control device is configured to communicate with an external server; and the external power supply information acquisition unit is configured to acquire the information on the external power supply from the external server.

4. The electrified vehicle accordingly to claim 1, wherein the control device is configured to set the first target temperature or the second target temperature of the storage battery to a lower value when the maximum output of the external power supply is a first value than when the maximum output of the external power supply is a second value lower than the first value.

5. The electrified vehicle according to claim 1, wherein:

the first map defines a first temperature curve representing the first target temperature as a function of the maximum output of the external power supply, the first curve having a concave upward shape, the second map defines a second temperature curve representing the second target temperature as a function of the maximum output of the external power supply, the second temperature curve having a concave downward shape, and the control device is configured to determine the first target temperature and the second target temperature from respective points on the first temperature curve and the second temperature curve corresponding to the maximum output of the external power supply.

* * * * *